United States Patent [19]

Hehl

[11] 3,852,010

[45] Dec. 3, 1974

[54] INJECTION MOLDING MACHINE WITH OPTIONAL PIVOTABLE SUPPORT FRAME

[76] Inventor: Karl Hehl, Siedlung 183, 7291 Lossburg/Wuerttemberg, Germany

[22] Filed: Nov. 15, 1972

[21] Appl. No.: 306,629

[30] Foreign Application Priority Data
Nov. 16, 1971 Germany............................ 2156818

[52] U.S. Cl.............. 425/192, 425/242 R, 425/190, 425/450.1
[51] Int. Cl................................................ B29f 1/00
[58] Field of Search............ 425/242 R, 192, 450 R, 425/190, 193, 182, 409, 188

[56] References Cited
UNITED STATES PATENTS

| | | | |
|---|---|---|---|
| 2,773,283 | 12/1956 | Malamoud et al.................. | 425/188 |
| 3,373,459 | 3/1968 | Hehl .............................. | 425/450 X |
| 3,564,658 | 2/1971 | Hehl .............................. | 425/192 X |
| 3,596,325 | 8/1971 | Hehl .............................. | 425/242 X |
| 3,782,874 | 1/1974 | Hehl .................................. | 425/190 |

Primary Examiner—Andrew R. Juhasz
Assistant Examiner—David S. Safran
Attorney, Agent, or Firm—Joseph A. Geiger

[57] ABSTRACT

An injection molding machine which is adaptable to different operating requirements as a result of having a support frame pivotably arranged on the forward upper edge of the machine base in a first assembly configuration as a multi-purpose machine with pivotability and longitudinal adjustability of the die closing unit and injection units in either a horizontal or a vertical operating position, the support frame and pivoting means being dispensed with in a second, simplified assembly configuration as a single-purpose machine using an identical machine base and die closing unit.

10 Claims, 22 Drawing Figures

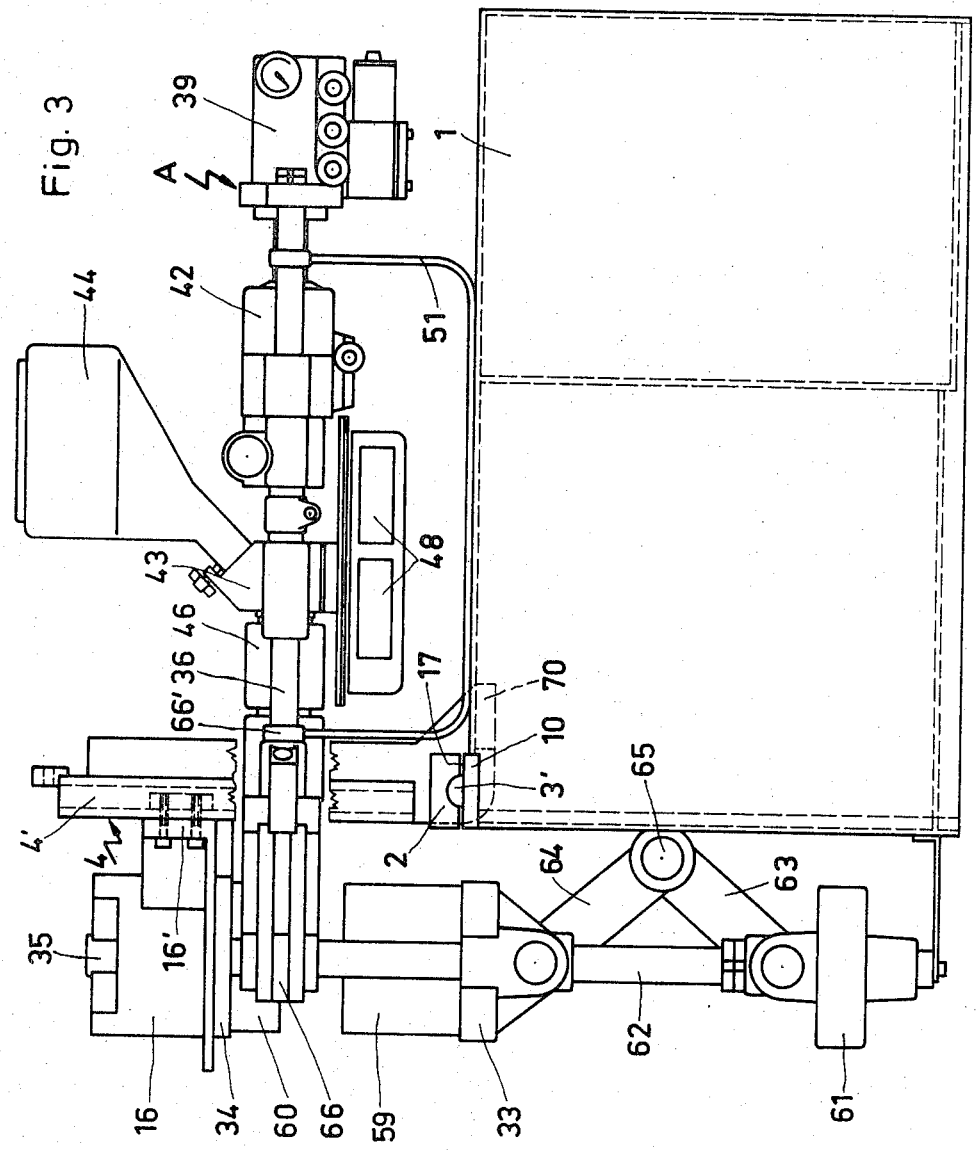

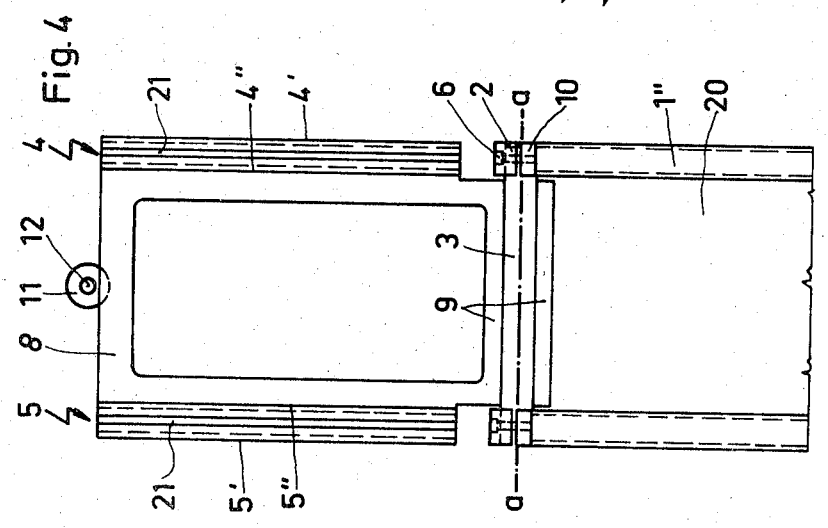

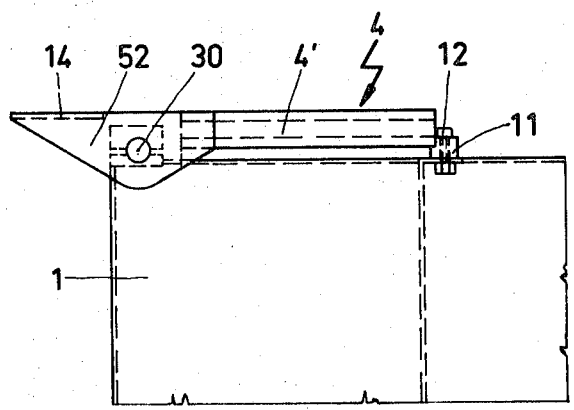
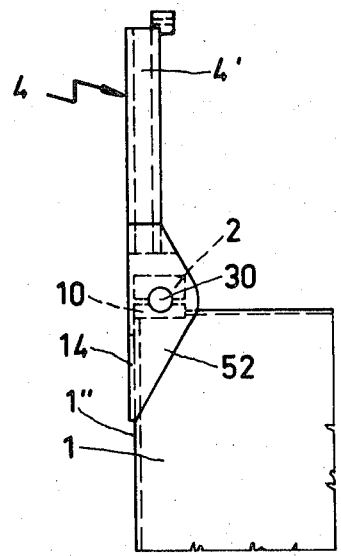
Fig. 8    Fig. 9
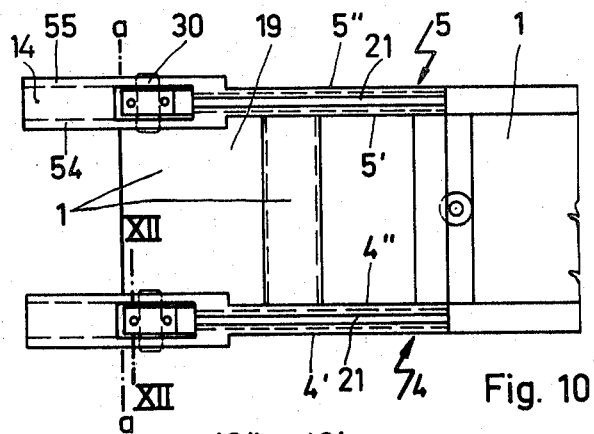
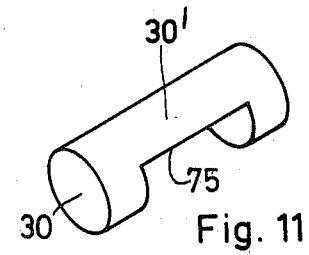
Fig. 10    Fig. 11
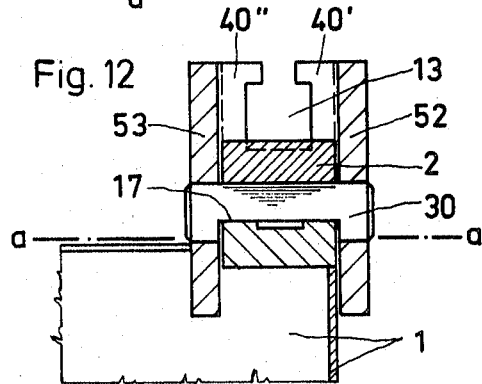
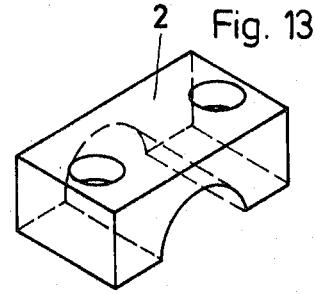
Fig. 12    Fig. 13

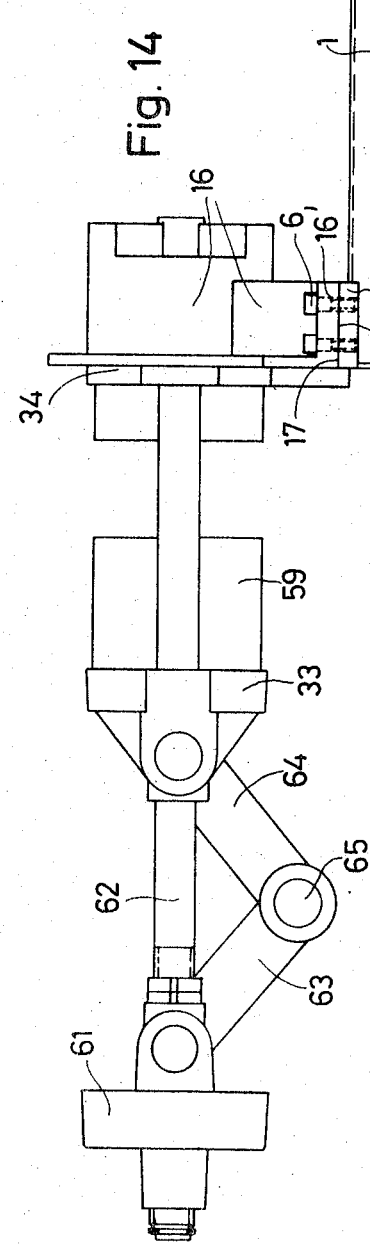
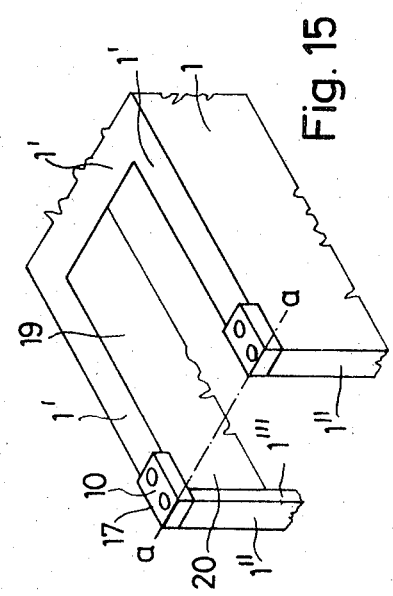

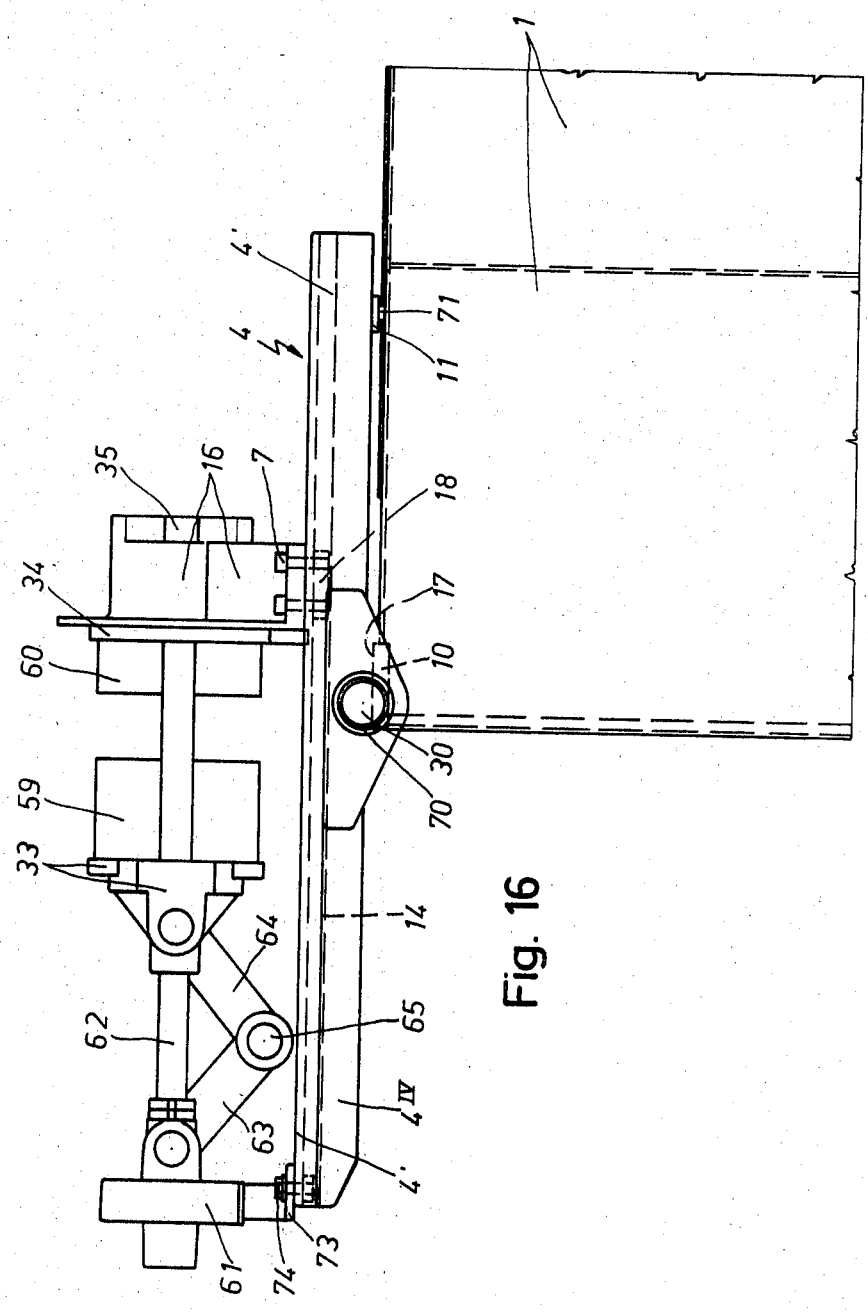

Fig. 18
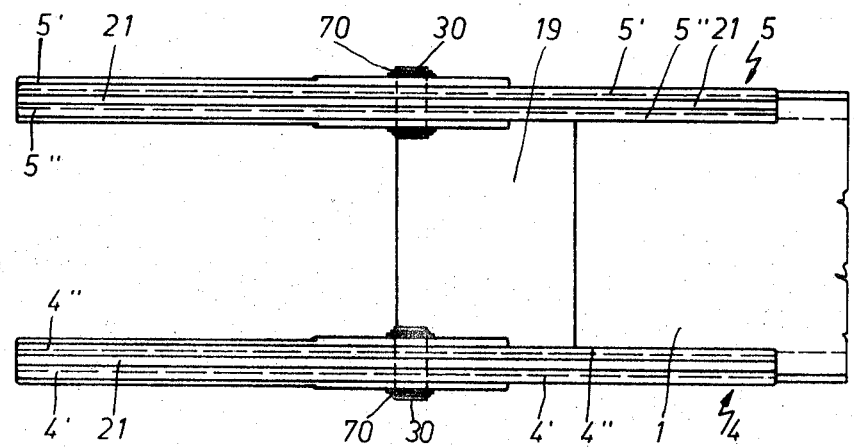
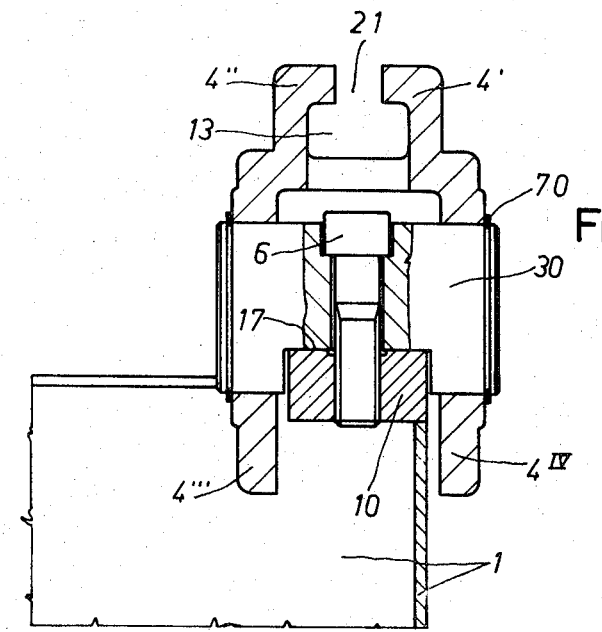
Fig. 19

INJECTION MOLDING MACHINE WITH OPTIONAL PIVOTABLE SUPPORT FRAME

BACKGROUND OF THE INVENTION

1. Field of the Invention

The invention relates to injection molding machines, and in particular to injection molding machines which are adaptable to different operating conditions by providing for longitudinal adjustment and pivoting of the die closing unit on the machine base.

2. Description of the Prior Art

U.S. Pat. No. 3,564,658 discloses an injection molding machine of the above-mentioned type, where longitudinal adjustment and pivotability of the die closing unit relative to the machine base is provided by means of a support frame for the die closing unit which provides longitudinal adjustability of the latter relative to the support frame and which is connected to the upper forward edge of the machine base by means of a pivot connection. The pivoting motion of the die closing unit is obtained by means of a hydraulic mechanism which moves the support frame between a horizontal and a vertical position. This prior art device makes possible mounting of injection units either in the axis of the die closing unit or perpendicularly thereto, as well as in both axes at the same time.

This prior art machine has the disadvantage, however, that it is more complicated in design than a similar machine without such adjustability, and that not ready convertability exists between the simple machine version and the pivotable, versatile machine version.

SUMMARY OF THE INVENTION

It is an objective of the present invention to provide an injection molding machine which represents an improvement over the prior art machine by not having the earlier-mentioned shortcomings.

The invention proposes to attain this objective by suggesting an injection molding machine which is designed to serve both as multi-purpose machine and as a single-purpose machine, in order to meet varying requirements of different customers.

In its multi-purpose version, the injection molding machine of the invention is designed to operate in a horizontal position or in a vertical position, with the injection units so arranged that they can inject either in the separation plane of the mold or perpendicularly thereto, or in both directions simultaneously.

In the single-purpose version of the machine, the two earlier-mentioned directions of injection into the mold are possible only when the machine is in its horizontal position.

In order to obtain the above-mentioned results, the machine of the invention is provided with a machine base and die closing unit which are so designed that they permit two different assembly configurations, with or without a pivotable support frame between them. In assembly configuration I the die closing unit is mounted on a pivotable support frame which in turn is mounted on the machine base by means of a pivot member which is attached to FLAT mounting faces on the forward upper edge of the machine base. This support frame gives the injection molding machine longitudinal and pivoting adjustability, as required in the multi-purpose version. In the assembly configuration II the die closing unit is directly mounted onto the flat mounting faces of the machine base without the interposition of the support frame and pivot member. The machine thus becomes a single-purpose injection molding machine without requiring additional parts or modifications of the machine base and die closing unit.

A major advantage of the invention resides in the economies of production afforded by it, in that different assembly configurations can be obtained from the same basic parts by using the so-called building block principle. The economies of production realized by such an approach are the results of standarization of the basic machine units as "building blocks" in such a way that they permit several assembly configurations custom-made to the needs of the machine user.

BRIEF DESCRIPTION OF THE DRAWINGS

Further special features and advantages of the invention will become apparent from the description following below, when taken together with the accompanying drawings which illustrate, by way of examples, several embodiments of the invention, represented in the various figures as follows:

FIG. 3 shows another elevational side view of the machine of FIG. 1 with the die closing unit arranged in a vertical position;

FIG. 4 shows a partial elevational front view of the machine as shown in FIG. 3, but with the die closing unit and injection units removed;

FIG. 5 shows an enlarged side view detail of the support frame of the machine of FIGS. 1–4;

FIG. 6 shows a further enlarged front view detail of the support frame of the machine in a horizontal position;

FIG. 7 shows a corresponding front view detail of the machine base and pivot shaft;

FIG. 8 shows a modified embodiment of a support frame for the machine of FIGS. 1–3 in its horizontal position;

FIG. 9 shows the frame of FIG. 8 in its vertical position;

FIG. 10 shows the frame of FIG. 8 in a plan view;

FIG. 11 shows in an enlarged perspective representation a pivot member as proposed in combination with the support frame of FIGS. 8–10;

FIG. 12 shows an enlarged partial cross section along line XII—XII of FIG. 10;

FIG. 13 shows in an enlarged perspective view a clamping block for use with the support frame of the invention;

FIG. 14 is an elevational side view of an injection molding machine composed of identical assembly units as shown in FIG. 1, but without the support frame, arranged in assembly configuration II (single-purpose version) as an alternate embodiment of the invention;

FIG. 15 shows in a perspective view the common machine base for the embodiments of FIGS 1 –3 and 14;

FIG. 16 shows in an elevational side view a third embodiment of the invention in assembly configuration I with a horizontally arranged die closing unit;

FIG. 18 shows a plan view of the machine configuration of FIG. 16 with the die closing unit removed;

FIG. 19 is an enlarged partial cross section through the pivot of the support frame of the machine embodiment of FIGS. 16–18;

DESCRIPTION OF THE PREFERRED EMBODIMENTS

Figures 1, 2:
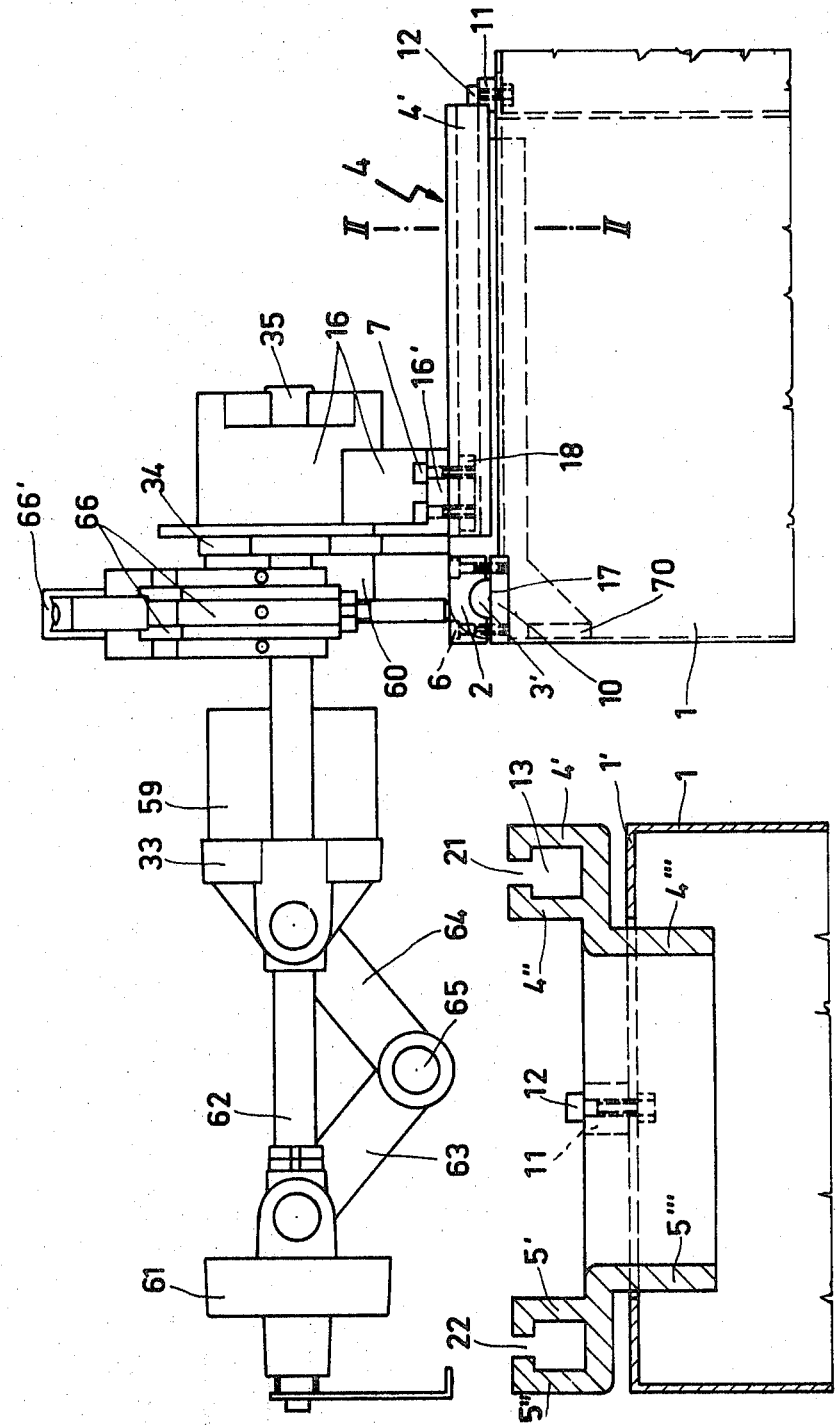
FIG. 1 shows in an elevational side view an injection molding machine with a horizontally arranged die closing unit in assembly configuration I (multi-purpose type) as an embodiment of the invention.
FIG. 2 is an enlarged partial cross section along line II—II of FIG. 1.
Figure 17:
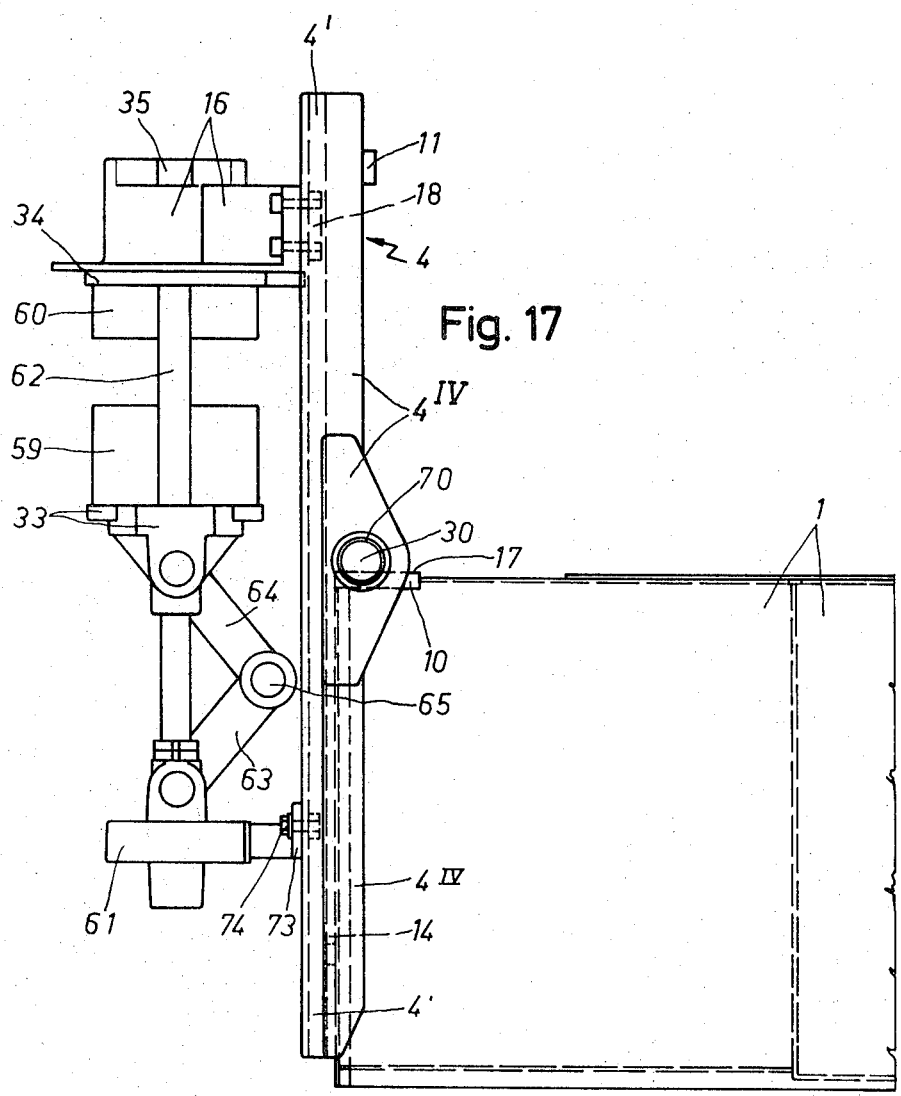
FIG. 17 shows the machine of FIG. 16 with the die closing unit arranged vertically.

FIGS. 1–3 show a first embodiment of the injection molding machine according to the invention. The machine includes a block-shaped machine base 1 made of sheet metal components. In the area which includes the upper forward edge of the machine base (shown at a—a in FIG. 15) the machine base is provided with apertures in the walls 1' and 1" which form the upper portion and forward front portion, respectively, of the base, the apertures being shown at 19 and 20 in FIG. 15. These apertures are so arranged that they leave a longitudinal ledge of the original wall, shown as ledge 1' along aperture 19 in the top wall of machine base 1 and ledge 1" along aperture 20 in the forward end wall of base 1. The ledges 1" bordering aperture 20 are in addition provided with an inwardly directed reinforcement ledge 1'" along the vertical borders of aperture 20. The horizontal ledges 1' further carry in the vicinity of the forward edge a—a of base 1 a pair of mounting blocks 10 which are so arranged that they are additionally supported by the reinforcement ledges 1'".

FIGS. 1–7 illustrate details of an embodiment which includes as a pivot element for the injection molding machine a pivot shaft 3 which extends across aperture 19 of the machine base from one mounting block 10 to the other mounting block 10. The shaft 3 is fixedly attached to the two mounting blocks, and for this purpose is provided with flat mounting faces 17 on its opposite end portions 3'. With these mounting faces 17 the pivot shaft 3 is firmly clamped onto the mounting blocks 10 of machine base 1 by means of clamping blocks 2 and clamping screws 6.

The machine assembly of FIGS. 1–3 includes a pivotable support frame 4–9, best visible in FIG. 4, which is pivotably mounted on pivot shaft 3. This support frame 4–9 includes two spaced rail profiles 4 and 5 which extend at right angles from the pivot axis. The rail profiles 4 and and 5 are generally rectangular in cross section, with aligned upper mounting faces and inverted T-shaped grooves 21, 13 extending in the upper portion of the profile. The end portions of these rail profiles are linked together by transverse connecting members 8 and 9, member 9 being bored hollow to engage pivot shaft 3 (FIG. 4). The support frame is thus made pivotable around shaft 3, and a die closing unit mounted on the rail profiles as shown in FIGS. 1 and 2 is therefore likewise pivotable around shaft 3 from a horizontal position as shown in FIGS. 1 and 2 into a vertical position as shown in FIGS. 3 and 4. In its horizontal position the support frame is additionally secured to the machine base 1 by means of a mounting eye 11 which is arranged at mid-length of connecting member 8 of the supporting frame (FIG. 4). The securing bolt 12 extending through the mounting eye 11 of the support frame and through the upper wall 1' of machine base 1 has to be removed before the support frame with the die closing unit mounted thereon can be pivoted from its horizontal position into its vertical position as shown in FIG. 3. In this latter position the support frame 4–9 is maintained in position by oppositely arranged abutment ears 70 on the forward end of support frame 4–9 (FIGS. 5 and 6). These abutment ears bear from underneath against the ledges 1' of the upper wall of base 1 (FIG. 3). These abutment ears 70 are preferably arranged as extensions of downwardly extending longitudinal reinforcement profiles 4'" and 5'" of support frame 4–9.

The drawings, in FIGS. 1, 3, 14, 16, 17 and 20, show a basic die closing unit of the knee-action type. This type of die closing unit includes a pair of longitudinally extending stationary guide rods 62 which are mounted on one end to a stationary die support 16 and on the other hand to a stationary, but longitudinally adjustable end support 61. The moveable die support 33 is supported by the guide rods 62 and connected to a knee linkage 63, 64, 65 whose opposite end is anchored at the end support 61. Transverse movement of the knee linkage at 65 produces the longitudinal movement of the moveable die support 33 along the guide rods 62 toward and away from the stationary die support 16. On its forward face the stationary die support 16 carries a stationary die half 60, the moveable die support 33 carrying on its rear face a matching moveable die half 59. In this particular die closing unit the stationary die support 16 further includes a support plate 34 interposed between the die support 16 and the stationary die half 60. This support plate 34 is spring-biased toward the moveable die support and permits a small yielding motion when the dies are being closed. The arrangement of such a support plate is part of a safety device for the injection molding machine and is not a necessary part of the present invention.

As mentioned earlier, the die closing unit may be mounted on the upper faces of the rail profiles 4 and 5 of a support frame 4–9 as shown in FIG. 1, for example. In this arrangement, which represents assembly configuration I, the mounting flanges 16' of the stationary die support are clamped against the rail profiles 4 and 5 by means of clamping bolts 7 and threaded blocks 18 which are positioned inside the T-grooves of the profiles. This mounting arrangement permits longitudinal adjustability of the stationary die support 16 relative to the machine base 1. This longitudinal adjustability is particularly useful, when the die closing unit is in the vertical operating position as shown in FIG. 3 where it may be necessary to adjust the vertical position of the separation plane of the die halves 59 and 60 to the axis of a vertically non-adjustable injection unit A, as shown in FIG. 3.

The stationary die support 16 further includes axially oriented mounting sleeves 35 for the attachment of an injection unit which operates in the direction perpendicular to the die separation plane. For the mounting of an injection unit operating in alignment with the die separation plane the die closing unit includes mounting elements 66 which are attached to the guide rods 62 of the die closing unit. These mounting elements 66 are clamped to the guide rods 62 and include mounting sleeves 66' into which the support rods 36 of the injection unit can be inserted. As can be seen by comparing the arrangements of FIGS. 1 and 3, the mounting elements 66 in one case extend in the opposite direction from that shown in the other case, in order to permit the most convenient positioning of the injection unit A.

The injection unit A as shown in FIG. 3 includes a hopper 44 for the raw material in granular form and an injection cylinder 46 which is mounted between the two support rods 36 of the injection unit. A temperature control device 48 is arranged on the lower side of the unit. A hydraulic cylinder 39 mounted between the rear ends of the two support rods 36 creates the appraoching and retracting motion of the injection unit toward and away from the injection mold. A drive drive 42 for a screw conveyor under the granulate hopper 44 is likewise mounted between the rods 36. A frame 51 serves to support the horizontal injection unit on the upper face of the machine base 1, when the unit is removed from the die closing unit for servicing, for example.

In FIGS. 8–13 is illustrated a modified embodiment of a support frame for the die closing unit. Here, the rail profiles 4 and 5 of the support frame are connected to abutment extensions 14 which extend horizontally a distance beyond the pivot center of the support frame. These abutments 14 are so arranged that they cooperate with the lateral ledges 1'' of the forward end wall of the machine base 1, when the die closing unit and support frame are pivoted into the vertical operating position. The rail profiles 4 and 5 in this case are connected to vertical plates 52 and 53 which include bores for the pivot pins 30 and which carry the abutment brackets 14 in their length portion forward of the pivot point. The pivot itself is formed by means of two separate pivot elements 30 (FIG. 11), each being mounted on one of the two mounting blocks 10 of base 1. For this purpose each pivot element 30 is provided with a central flat mounting face 17 with which it is clamped against the mounting block 10 by means of a clamping block 2 (FIG. 13). The cylindrical end portions of the pivot elements 30 engage corresponding pivot bores in the vertical side plates 52, 53, 54 and 55 of the support frame, the latter enclosing the mounting blocks 10 and clamping blocks 2 of the machine in such a way that they provide a lateral guide for the rail profiles. This arrangement eliminates the need for a transverse connecting member in the area of the pivot axis. The rear portion of the support frame and the profiles 4 and 5 themselves are similar to the frame embodiment shown in FIGS. 4–6.

In FIG. 14 is shown a single-purpose version of the injection molding machine which was described in the foregoing. This single-purpose machine is here designated as assembly configuration II. This configuration comprises an identical machine base as shown in FIGS. 1–12, and the die closing unit mounted on it is identical to that shown in FIGS. 1 and 3. The injection unit, which would be of the standard type as shown in FIG. 3, has been omitted. In this case, however, the stationary die support 16 is mounted directly on the mounting blocks 10 of the machine base 1 by means of bolts 6, the mounting flanges 16' of the die support taking the position of the earlier-described pivot members 3 and clamping blocks 2. This simplified assembly configuration thus has no support frame and therefore does not include the features of pivotability and longitudinal adjustability.

FIGS. 16–19 show another embodiment of the injection molding machine according to the present invention in its multi-purpose version, as represented by assembly configuration I. The main differences of this embodiment is a support frame consisting of two separate rail profiles 4 and 5, without transverse connecting members, each rail profile being pivotably mounted on machine base 1 in a manner similar to that shown in FIGS. 8–13. This design of the support frame is such that the rail profiles 4 and 5 can be identical castings (FIG. 18). In this case, however, the rail profiles are much longer than those of the previously described embodiments, extending over the full length of the die closing unit so as to provide a support for the end support 61 of the latter in both the horizontal and vertical operating positions of the die closing unit. In this embodiment of the support frame the earlier vertical side plates are replaced by reinforced vertical brackets 4''' and 4$^{IV}$ as integral parts of the cast rail profiles. These vertical brackets 4''' and 4$^{IV}$ contain the bores for two pivot members 30 similar to the pivot members 30 of FIG. 11. The rail profiles extending forward and aft of the pivot point are so arranged that they straddle the lateral ledges 1' and 1'' of the machine base 1 alongside the apertures 19 and 20, the forward portion of the rail profiles thus abuting with their abutment faces 14 on the entire length of the vertical ledges 1'' of base 1, when the die closing unit is in the vertical operating position. As can be seen from the drawing, the T-shaped groove of the rail profiles 4 and 5 extends over the entire length of these profiles, thus permitting mounting of the stationary die support 16 and of the end supports 61 in a similar manner by means of bolts 74 and threaded members engaging the T-shaped groove. In their horizontal position the rail profiles 4 and 5 are secured against the upper face of machine base 1 by means of fastening eyes 11 and removeable bolts 71.

Figure 20:
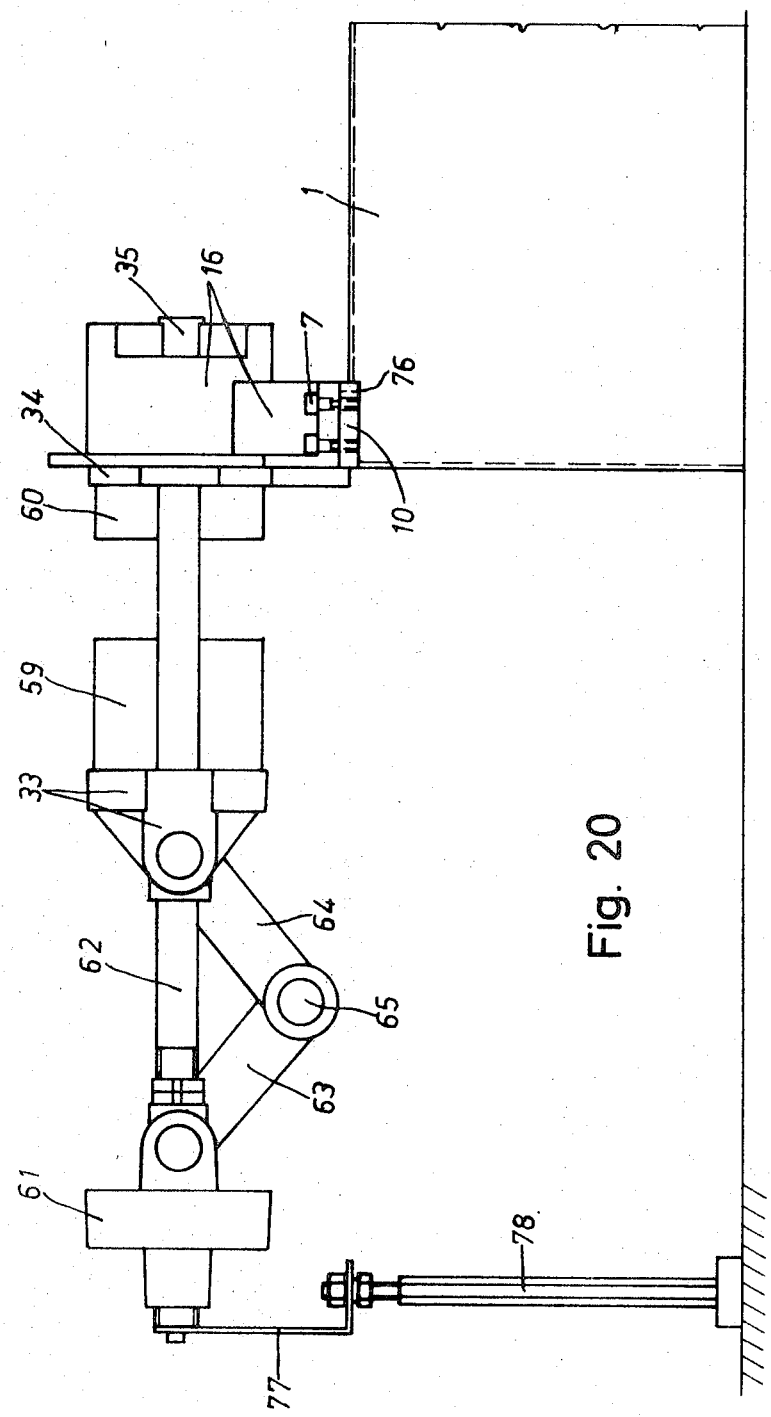
FIG. 20 shows the machine components of the embodiment of FIGS. 16–18 in the simplified assembly configuration II, without the pivotable support frame.

FIG. 20 of the drawing shows the earlier-described injection molding machine as a single-purpose version, in assembly configuration II. As in the previously described configuration II, the stationary die support 16 is again directly mounted on the mounting blocks 10 of machine base 1, by eliminating the support frame and pivot members. In this case the end support 61 of the die closing unit requires separate supporting means in the form of an angle 77 and an adjustable supporting strut 78 resting on the floor surface.

Figure 21:
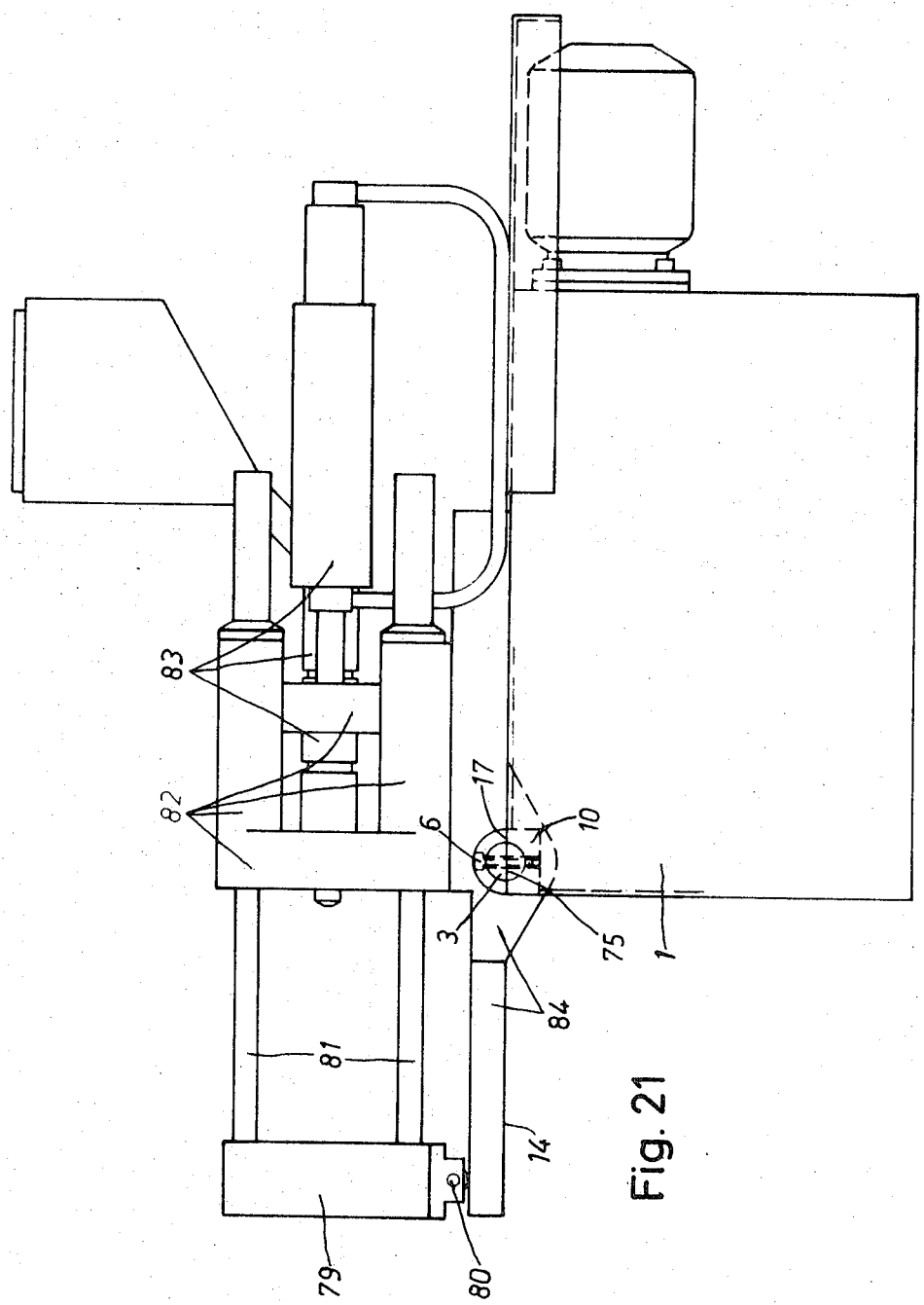
FIG. 21 shows in an elevational side view a still further embodiment of the invention as assembled for multi-purpose use (machine configuration I)
Figure 22:
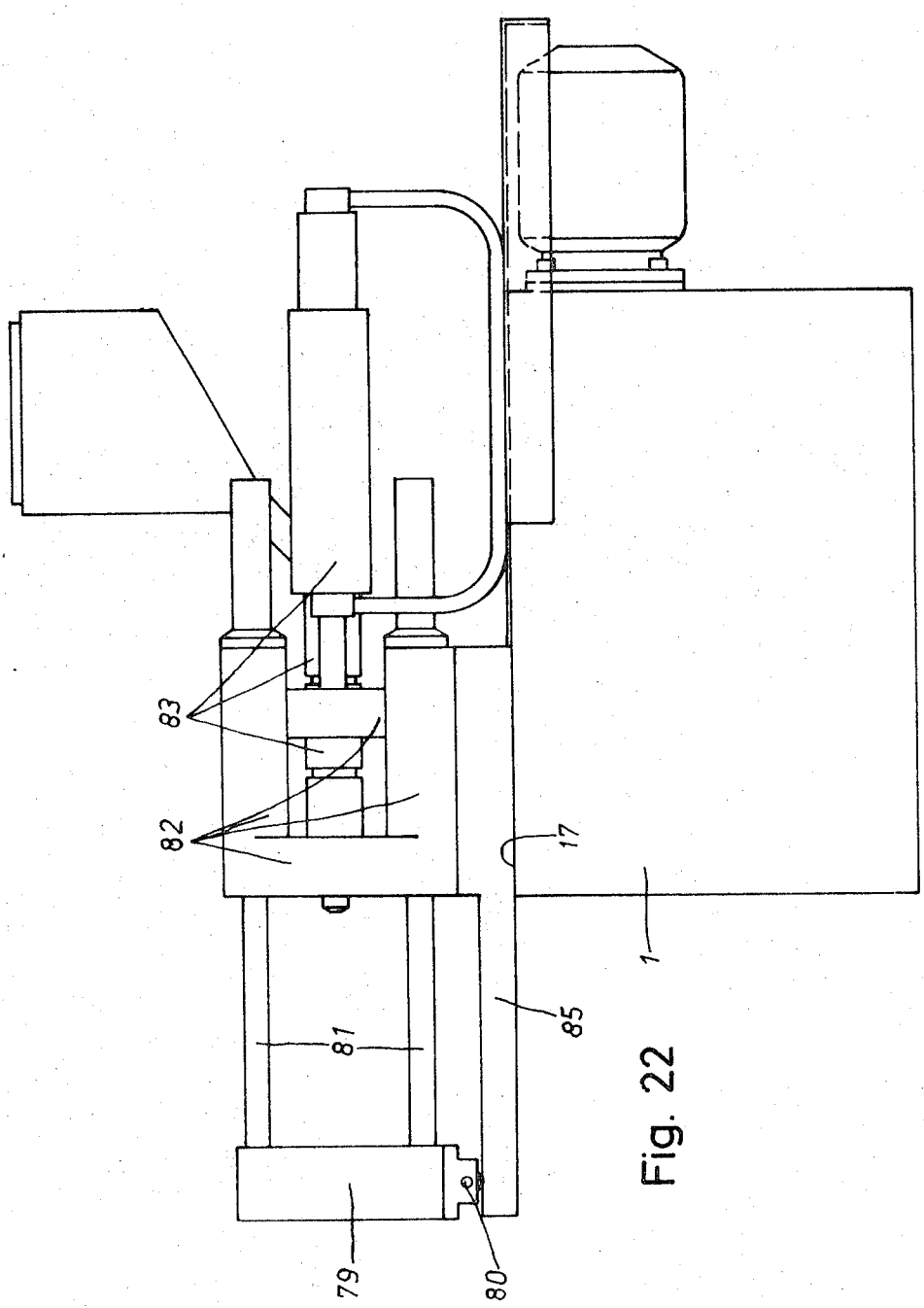
FIG. 22 shows the machine of FIG. 21 as assembled for single-purpose use (machine configuration II).

A still further embodiment of the injection molding machine is shown in FIGS. 21 and 22 in the two assembly configurations I and II. In this case the die closing unit is of the multi-cylinder type, where the moveable die carrier 79 is directly attached to the forward ends of the piston rods 81 which are part of the hydraulic cylinder assemblies arranged in a cylinder mount 82. The moveable die carrier 39 is supported by means of a roller connection 80 on the forward portion of a pivotable support frame which is comparable to the support frames described earlier. In this case, however, the support frame includes transverse connecting members (not shown) between the rail profiles to the rear of the pivot point and between the support profiles 84 which extend forward of the pivot point.

The pivot shaft in this case is similar to that shown in FIGS. 4 and 7 (first embodiment), extending between the two mounting blocks 10 of base 1 through a bored transverse connecting member of the support frame. FIG. 21 also shows an injection unit attached to the cylinder mount and stationary die support of the die closing unit for injection in a direction perpendicular to the die separation plane.

FIG. 22 shows the injection molding unit of the last-described embodiment in assembly configuration II for single-purpose applications. Again, the support frame and pivot shaft are eliminated, and the die closing unit is directly mounted on the upper face of machine base 1 in a horizontal operating position.

I claim:

1. In an injection molding machine which includes a die closing unit and at least one injection unit on a machine base, a combination of mounting elements for mounting the die closing unit on the machine base in two different assembly configurations, the combination comprising:
   a generally horizontal upper end wall and a generally vertical forward end wall as parts of the machine base;
   a horizontal mounting face defined by the machine base in the area of its upper end wall bordering its forward edge above said forward end wall, the mounting face including two mounting emplacements at opposite sides of the machine base to which the die closing unit is directly attachable in a first, fixed assembly configuration; and
   a pivotable support frame which is interposable between the die closing unit and the mounting face of the machine base in a second, pivotability-providing assembly configuration; and wherein said support frame includes:
   means for pivotably attaching the support frame to the mounting face at its mounting emplacement so as to permit pivoting of the support frame between a horizontal and a vertical position, said pivoting means including an inner pivot member journalled in the support member and adapted for attachment to the two mounting emplacements of the mounting face; and
   two spaced, parallel rail profiles extending perpendicular to the pivot axis defined by said pivoting means and having generally flat upper mounting faces to which the die closing unit is attachable in said second assembly configuration.

2. A combination as defined in claim 1, wherein the support frame further includes means for longitudinally adjusting the mounting position of the die closing unit along the rail profiles of the support frame in terms of its distance from the pivot axis.

3. A combination as defined in claim 2, wherein the rail profiles of the mounting frame are provided with an inverted T-shaped groove for sliding adjustment of the die closing unit along the rail profiles and clamping of the unit to the rail profiles.

4. A combination as defined in claim 1, wherein: the inner pivot member includes flattened portions with which it engages the mounting surface at its two mounting emplacements.

5. A combination as defined in claim 1, wherein the pivot member comprises two separate pivot member portions arranged in axial alignment with one another and spaced in accordance with the spacing of the mounting emplacements.

6. A combination as defined in claim 1, wherein the support frame further includes at least one transverse connecting member between its rail profiles in the area of the pivot point, the connecting member being bored to cooperate with the pivot member.

7. A combination as defined in claim 1, wherein the support frame further includes:
   means for securing the support frame in its horizontal position to the upper wall of the machine base; and
   means for abutting the pivoted support frame against the machine base in the vertical position of the support frame.

8. A combination as defined in claim 1, wherein the support frame extends forwardly beyond the pivot and beyond the vertical end wall of the machine base and includes vertical wall portions having pivot bores cooperating with the pivot member; and
   the pivot member comprises two separate pivot member portions in axial alignment with one another and mounted at the mounting emplacements of the machine base, each pivot member portion supporting one of the rail profiles.

9. A combination as defined in claim 8, wherein the support frame extends forward beyond the pivot point such a distance that it can also serve as a supporting means for the die closing unit in the area forward of the pivot point.

10. A combination as defined in claim 8, wherein: the vertical wall portions of the support frame are an integral part of the rail profiles, the latter extending from the pivot point in both directions, being pivotable about said pivot point independently of each other.

* * * * *